United States Patent [19]

Fechner et al.

[11] Patent Number: 4,993,003

[45] Date of Patent: Feb. 12, 1991

[54] APPARATUS FOR UPDATING TIME-OF-DAY INFORMATION IN A SIGNAL

[75] Inventors: Rainer Fechner, VS-Villingen; Thomas Békesi, Niedereschach, both of Fed. Rep. of Germany

[73] Assignee: Electronic-Werke Deutschland GmbH, Villingen-Schwenningen, Fed. Rep. of Germany

[21] Appl. No.: 389,913

[22] Filed: Aug. 7, 1989

[30] Foreign Application Priority Data

Aug. 17, 1988 [DE] Fed. Rep. of Germany ....... 3827837

[51] Int. Cl.$^5$ ............................................. G04C 11/02
[52] U.S. Cl. .................................................... 368/47
[58] Field of Search ........................ 368/47, 46, 48–52, 368/107–120

[56] References Cited

U.S. PATENT DOCUMENTS

| | | | |
|---|---|---|---|
| 3,530,663 | 9/1970 | Marti | 368/47 |
| 4,087,958 | 5/1978 | Ebihara et al. | 368/47 |
| 4,187,518 | 2/1980 | Martin et al. | 368/47 |
| 4,440,501 | 4/1984 | Schulz | 368/47 |
| 4,525,685 | 6/1985 | Hesselberth et al. | 368/47 |
| 4,582,434 | 4/1986 | Plangger et al. | 368/47 |
| 4,650,344 | 3/1987 | Allgair et al. | 368/47 |

FOREIGN PATENT DOCUMENTS 0185160 6/1986 European Pat. Off. .............. 368/47
0042913 1/1985 Fed. Rep. of Germany .

OTHER PUBLICATIONS

Longwave clock with Microcomputer SAB 8048(8748), Viehmann, Components report XIV (1979) No. 5.
An Article Containing Preliminary Information Entitled "Thomson Infrared VPV System", dated prior to Apr. 7, 1988.
An Article in ELV Journal, No. 41, pp. 41–47, dated 1985, the translated title being "ELV Series Micro-Line: Radio Clock System Doc 85".
An Abstract of a research report TK 0054, dated Jan. 1980, the translated title being "Digital Identification System ZPS", in the name of Freienstein et al.
An Article dated 1977, the translated title being "Electronics of the EBU/CRT Time Code System", in the name of A. Heller.
German Pat. Appl. No. DE 2802040A1, laid open date 1979, entitled "Time-Signal Controlled Digital Clock System with High Interference Security", the inventor being P. Gravenhorst.
German Pat. Appl. No. DE 2643250, laid open date 1978, entitled "Centrally Controlled Clock", the inventors being Steiner et al.
German Pat. Appl. No. P3628964.7, laid open date Mar. 10, 1988, entitled "Method for Triggering A Switching Function in a Programmable Receiver Set of Consumer Electronics", the inventor being W. Schroder.
German Pat. Appl. No. DE 3144321A1, laid open date 1983, entitled "Radio Clock-Quartz Clock Combination", the inventors being W. Hillberg et al.
German Pat. Appl. No. DE 3510636A1, laid open date Sep. 25, 1986, in the names of J. Allgaier et al., entitled "Radio Clock".
German Pat. Appl. No. DE 3634752A1, laid open date Apr. 21, 1988, in the name of Wipperman.
An article entitled "Radio-Controlled and Supply Independent", dated 1985.
An article entitled "Radio Controlled Digital Clock of High Interference Security", in the name of Schreiber, published in Funk-Fechnik 32, dated 1977, No. 19, pp. 334–337.
German Pat. Appl. No. DE 3625382A1, laid open date Feb. 4, 1988, in the name of Hegendorfer, entitled "Device for the Recording of Satellite Television Broadcasts".

Primary Examiner—Bernard Roskoski
Attorney, Agent, or Firm—Joseph S. Tripoli; Joseph J. Laks; Sammy S. Henig

[57] ABSTRACT

A continuous time-of-day or date correction of a signal produced by a clock module is obtained from the data in a video-text or teletext signal that contains accurate time-of-day and/or date reference information. When the video-text/teletext data contain such reference information, the data of the output signal of the clock module are compared, on a continuous basis, with the received video-text/teletext. In case of a deviation between the clock module data and the reference information, a correction signal is applied to the clock module and corrects the clock module.

6 Claims, 1 Drawing Sheet

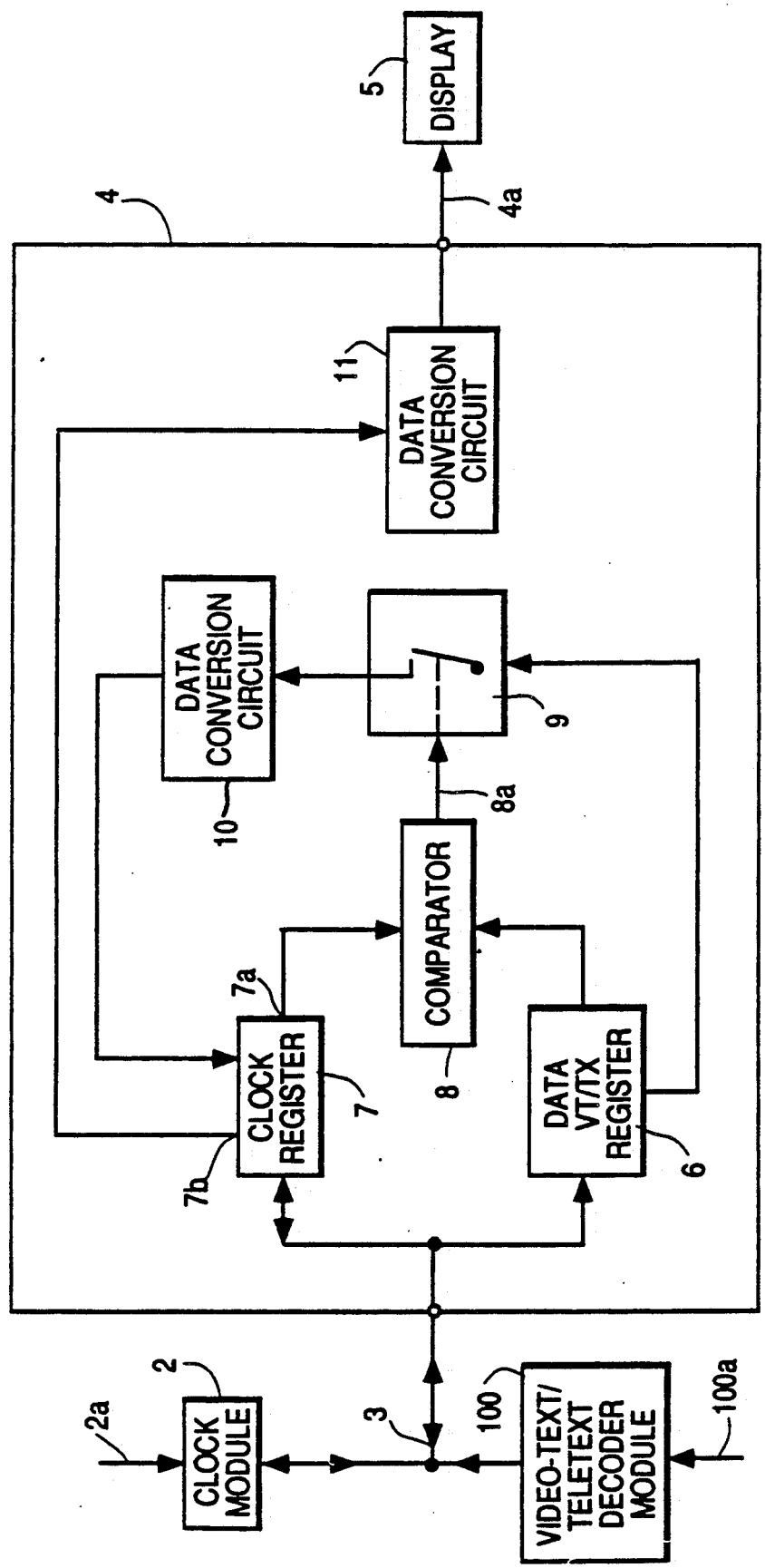

APPARATUS FOR UPDATING TIME-OF-DAY INFORMATION IN A SIGNAL

The invention relates to an apparatus for updating time-of-day and/or date information contained in a signal.

An output signal containing date information that is generated in a clock module may be used for providing display information in a display device such as a display device of a television receiver or for scheduling video recording times in a video tape recorder.

It has been suggested to obtain the time-of-day and date information required for initially setting up the clock module from information contained in a video-text or teletext signal. With this approach, the exact time-of-day and date is obtained, once, using a trigger command. However, disadvantageously, continuous or periodical correction of any time-of-date or date inaccuracy that may occur is not performed. It has also been suggested, in an article entitled ELV SERIE MICRO LINE FUNKUHRENSYSTEM DOC 85 published in ELV Journal No. 41, dated October 1985, to obtain a continuing synchronization of a clock from a signal received from a standard transmitter DCF 77.

It may be desirable to correct, automatically, the time-of-day and date information contained in the output signal of the clock module, in accordance with time-of-day and/or date information contained in the data of the video-text or teletext signal when such video-text or teletext signal carries time-of-day and/or date information.

In an arrangement, embodying a feature of the invention, the information contained in the clock module output signal is continuously monitored provided that teletext/video-text signal containing such information is received. When the time-of-day and/or date information contained in the clock module output signal is different from that contained in the video-text/teletext data, the clock module is synchronized or updated in accordance with the accurate information contained in the teletext/video-text data.

When such updating time-of-day and date information is not utilized, such as when no teletext or video-text signal is transmitted or received or when the teletext or video-text signal is interrupted or disturbed, the output signal of the clock module is free running. The time-of-day and date information contained in the output signal when it is a free running signal may deviate from the actual time-of-day and date, as a result of timing inaccuracy. During teletext or video-text signal transmission, the information contained in the clock module output signal may be, advantageously, automatically updated in accordance with the teletext/video-text signal to correct for the time inaccuracy in the clock module output signal.

An advantage of synchronizing or updating the clock module output signal in accordance with the teletext or video-text data becomes evident when considering switching-over from summer, or daylight saving time, to winter, or standard time, and vice versa. When the clock module is synchronized in accordance with the teletext or video-text data, such time-of-day and date information updating is performed, advantageously, automatically, immediately after receiving the video-text or teletext data.

The data of the output signal that is generated by such electronic local clock module that may be used for providing display information to the display device are generallly coded as binary data and processed in a suitable decoder prior to being applied to the display device. The video-text data are typically transmitted in the ASCII code.

The received video-text/teletext data are compared with the data generated by the clock module in a comparator logic circuit. When data deviation is detected, a comparator output signal is generated by the comparator logic circuit. The comparator output signal causes the data of the video-text/teletext signal to be converted into binary code and to be transferred back to the clock module. Using these transferred data, the clock module is newly set and updated. In cases of a larger deviation, occurring because of poor accuracy of the data generated in the clock module when it is free running, this process can be repeated, periodically. Thus, the time intervals for adjustment are kept as short as required for, advantageously, preventing the occurrence of abrupt, significant and noticeable time display changes.

In accordance with an aspect of the invention, a video-text or teletext input signal containing a time-of-day or date reference information is used for automatically updating a time-of-day or date information contained in an output signal that is generated in a clock generator. The output signal is updated in the clock generator in a free running manner in accordance with a timing signal that is independent of the input signal when the reference information is not used for updating the output signal.

The sole FIGURE illustrates a block diagram of an arrangement, embodying an aspect of the invention, for updating a time-of-day and/or date information, in accordance with corresponding information contained in video-text/teletext data.

The sole FIGURE illustrates a conventional video-text/teletext decoder module 100 responsive to an input video-text/teletext signal 100a and a clock module 2. Both modules 100 and 2 are coupled via a common data bus 3, such as of an I$^2$C bus type, to a decoding and comparator logic unit 4. Unit 4 provides the aforementioned time-of-day and/or date correction. Unit 4 generates an output signal 4a that is coupled to a display device 5 for providing the time-of-day and/or date information that is to be displayed in display device 5.

An output signal of clock module 2, that is in the binary code format, is coupled via bus 3 to a clock register 7 to be stored in register 7. On the other hand, an output signal of video-text decoder module 100, that is in the ASCII code format, is coupled via bus 3 to a video-text/teletext data register 6 to be stored in register 6.

Each of an output port 7a of clock register 7 and an output port 6a of data register 6 is coupled to corresponding input port of a comparator 8. Comparator 8 detects the presence of video-text/teletext data generated in decoder module 100 that contain a time-of-day and/or date information.

Assume, hypothetically, that it is detected in comparator 8 that decoder module 100 generates data containing the time-of-day and/or date information. Also assume that such information is detected in comparator 8 and found to be identical with the corresponding information contained in the output signal of clock module 2. In such case, the information contained in the output signal of clock module 2 will be coupled via a port 7b of register 7 and via a data conversion circuit 11 to display device 5 and clock module 2 will not be affected by decoder module 100.

In a second hypothetical situation, assume that there is a deviation or a difference between the time-of-day and/or date information contained in the output signal of clock module 2 and that in the output signal of decoder module 100. In this case, a signal 8a is generated in comparator 8 that is coupled to a control terminal of a switch 9. Signal 8a causes switch 9 to couple the data stored in register 6, that is in the ASCII format, via a data conversion circuit 10, via clock register 7 and via bus 3 back into clock module 2. The ASCII format of the data is converted in data conversion circuit 10 to the binary format. As a result of the binary formatted data that was transferred to clock module 2, for example, counters, not shown, of clock module 2 are preset. Consequently, the output signal of clock module 2 will contain the correct time-of-day and date information. As a result, there will no longer be a difference between the information contained in the output signals of modules 2 and 100. Therefore, comparator 8 output signal 8a will not be generated. Consequently, switch 9 will open. The result is that the information contained in the output signal of clock module 2 will be applied via bus 3, clock register 7 and data conversion circuit 11 to display 5, as explained before The procedure of testing for the occurrence of a difference between time-of-day and/or date information contained in the output signal of module 2 and that in module 100 may be repeated periodically. Therefore, large or abrupt variations in the displayed information, advantageously, may not occur and may not be noticeable by a viewer observing a display screen of display device 5. Outside the times in which the information contained in clock module 2 is updated, in accordance with decoder 100 output signal, clock module 2 is free running and its information is updated by a timing signal 2a, independently of decoder 100 output signal.

Decoding and comparator logic unit 4 may be implemented using a microprocessor such as microprocessor HMSCS 400 that is manufactured by Hitachi Corporation. Video-text/teletext decoder 100 may be implemented by integrated circuits of the SAA 5231 and SAA 5243 types that are manufactured by Valvo Corporation. Clock module 2 may be implemented by an integrated circuit PCF 8583 that is also manufactured by Valvo Corporation.

Alternatively, clock module 2 and unit 2 may be implemented in software by a microprocessor. Therefore, advantageously, the need to read data out of a module such as module 2 is obviated because such data is already contained in a register that is analogous to clock register 7 of unit 4. A suitable microprocessor for such alternative is HD 404709.

What is claimed is:

1. An apparatus for generating an updated output signal containing a time-of-day or date information, comprising:
   a source of a video-text/teletext input signal containing a time-of-day or date reference information;
   a clock generator responsive to a timing signal that is independent of said input signal for generating an output signal containing a time-of-day or date information; and
   means coupled to said clock generator and responsive to said input signal for automatically updating, in accordance with the reference information, the information contained in said output signal, such that when the reference information is not used for updating said output signal, said output signal is updated in said clock generator in a free running manner in accordance with said timing signal and:
   wherein said updating means comprises a comaprator means responsive to said output and input signals for generating a correction signal that is coupled back to said click generator when a difference between the information of each is detected, said correction signal correcting the information of said output signal in accordance with said input signal.

2. An apparatus according to claim 1 wherein the functions of said comparator and of said clock generator are implemented in software by a microprocessor.

3. An apparatus according to claim 1 wherein, as long as said input signal is not received or as long as it is received improperly, said clock generator generates said output signal in a manner that is updated independently of said input signal.

4. An apparatus according to claim 1 wherein said information of said output signal is updated selectively in accordance with said reference information that is contained in said input signal in one of an automatic and a manual manner.

5. An apparatus according to claim 1 wherein portions of said input signal containing correspondingly different time-of-day or date information in corresponding multilingual forms and wherein said apparatus comprises means for selecting a given portion of said portions of said input signal that contains a predetermined one of said multilingual forms for updating in accordance therwith said information of said output signal.

6. An apparatus for generating an output data signal containing a time-of-day or date information that is coupled to a display device for displaying said information therein, comprising:
   a clock module for generating a first data signal containing a corresponding time-of-day or date information;
   a video-text/teletext decoder for generating a second data signal containing a reference time-of-day or date information;
   a first data register responsive to said first data signal, that is coupled thereto from said clock module via a common bus, for storing said first data signal therein to produce said output data signal from said stored data signal;
   a second data register responsive to said second data signal, that is coupled thereto from said decoder via said common bus, for storing said second data signal;
   a comparator responsive to said stored signals for detecting a data deviation therebetween to generate a control signal when said deviation is detected;
   a data conversion arrangement; and
   a switch responsive to said comparator control signal for coupling said stored data in said second data register to said clock module via said data conversion arrangement and via said bus for adjusting said clock module in accordance with said stored data signal in said second data register.

* * * * *

UNITED STATES PATENT AND TRADEMARK OFFICE
CERTIFICATE OF CORRECTION

PATENT NO. : 4,993,003

DATED : February 12, 1991

INVENTOR(S) : RAINER FECHNER & THOMAS BEKESI

It is certified that error appears in the above-identified patent and that said Letters Patent is hereby corrected as shown below:

On the Title page column 1, the entry "[73] Assignee: Electronic-Werke Deutschland GmbH," should be changed to read -- [73] Assignee: Deutsche Thomson-Brandt GmbH, --.

Column 4, line 18, delete "in software".

Signed and Sealed this

Twenty-ninth Day of December, 1992

Attest:

DOUGLAS B. COMER

Attesting Officer      Acting Commissioner of Patents and Trademarks